(12) United States Patent
Keller (10) Patent No.: US 9,908,268 B2
(45) Date of Patent: *Mar. 6, 2018

(54) BAFFLE TANK FOR FILTERING A FLUID AND A METHOD OF FORMING THE BAFFLE TANK

(71) Applicant: Adam John Keller, Fremont, WI (US)

(72) Inventor: Adam John Keller, Fremont, WI (US)

(73) Assignee: Adam John Keller, Neenah, WI (US)

( * ) Notice: Subject to any disclaimer, the term of this patent is extended or adjusted under 35 U.S.C. 154(b) by 541 days.

This patent is subject to a terminal disclaimer.

(21) Appl. No.: 14/615,959

(22) Filed: Feb. 6, 2015

(65) Prior Publication Data

US 2016/0229587 A1    Aug. 11, 2016

(51) Int. Cl.
*B29C 41/04* (2006.01)
*C02F 3/02* (2006.01)
*B65D 25/04* (2006.01)
*B29K 23/00* (2006.01)
*B29L 22/00* (2006.01)

(52) U.S. Cl.
CPC ........ *B29C 41/04* (2013.01); *B29K 2023/065* (2013.01); *B29K 2023/0633* (2013.01); *B29K 2023/12* (2013.01); *B29L 2022/005* (2013.01); *C02F 2203/006* (2013.01)

(58) Field of Classification Search
CPC ... B29C 41/04; B29C 41/06; B29L 2022/005; B29L 2022/007; B65D 1/42; B65D 25/00; B65D 25/02; B65D 25/04; B65D 90/02; A01K 63/045; B60K 15/03; B60K 15/03066; B60K 15/077

See application file for complete search history.

(56) References Cited

U.S. PATENT DOCUMENTS 2,351,905 A * 6/1944 Basler ...................... D21F 1/00
                                                   162/336
3,768,652 A * 10/1973 Jardim .................. A01K 63/04
                                                   210/167.25

(Continued)

*Primary Examiner* — Jason M Greene
(74) *Attorney, Agent, or Firm* — Thomas J. Connelly; Northwind IP Law, S.C.

(57) ABSTRACT

A baffle tank is disclosed which is designed to filter a fluid along with a method of forming the baffle tank. The baffle tank has a bottom wall joined to at least one sidewall to form an enclosure having a first chamber in fluid communication with a second chamber. The first chamber has a top wall with an enlarged opening formed therein. The first chamber also has an inlet for receiving incoming fluid. The second chamber has a top wall with an enlarged opening formed therein. The second chamber also has an outlet through which fluid can be discharged. A first baffle is formed by at least a portion of the sidewall of the first chamber. The first baffle is joined to at least a portion of the sidewall of the second chamber. The first baffle extends downward from the top walls of the first and second chambers and has a lower end positioned above the bottom wall. A second baffle is formed in the second chamber and extends upward from the bottom wall and has an upper end positioned below the top wall of the second chamber. The lower end of the first baffle is located closer to the bottom wall than is the upper end of the second baffle.

20 Claims, 3 Drawing Sheets

(56) References Cited

U.S. PATENT DOCUMENTS

| | | | |
|---|---|---|---|
| 4,526,286 A * | 7/1985 | Jüng et al. | B60K 15/03177 |
| | | | 220/4.14 |
| 5,503,284 A * | 4/1996 | Li | B65D 1/023 |
| | | | 215/383 |
| 5,571,408 A * | 11/1996 | Rising | B01D 29/27 |
| | | | 210/167.29 |
| 5,626,747 A | 5/1997 | Ritzow et al. | |
| 6,056,886 A | 5/2000 | Hickok, Jr. et al. | |
| 6,770,194 B1 | 8/2004 | McGrath | |
| 7,175,481 B1 * | 2/2007 | Cotton | H01R 13/5202 |
| | | | 439/733.1 |
| 7,618,534 B2 | 11/2009 | Mihlbauer et al. | |
| 8,034,237 B2 | 10/2011 | Happel et al. | |
| 8,132,534 B2 | 3/2012 | Arita et al. | |
| 9,409,804 B1 * | 8/2016 | Keller | C02F 1/001 |
| 2001/0054445 A1 * | 12/2001 | Evanovich | B29C 41/06 |
| | | | 137/574 |
| 2006/0207991 A1 * | 9/2006 | Sugiura | B60K 15/03177 |
| | | | 220/563 |
| 2009/0078627 A1 * | 3/2009 | Jannot | B60K 15/03 |
| | | | 210/120 |
| 2009/0230133 A1 * | 9/2009 | Takeuchi | B60K 15/03 |
| | | | 220/562 |
| 2009/0250121 A1 | 10/2009 | Kirkman | |
| 2010/0300027 A1 * | 12/2010 | Bravo | E04F 15/105 |
| | | | 52/311.1 |
| 2012/0097318 A1 * | 4/2012 | Thompson | B60K 15/03177 |
| | | | 156/91 |

* cited by examiner

BAFFLE TANK FOR FILTERING A FLUID AND A METHOD OF FORMING THE BAFFLE TANK

FIELD OF THE INVENTION

This invention relates to a baffle tank for filtering a fluid and a method of forming the baffle tank.

BACKGROUND OF THE INVENTION

Today, there are many different applications where a fluid needs to be filtered. In many commercial, industrial, municipal and residential applications and processes, a fluid, either a liquid or a gas, needs to be filtered. The kind of fluid can vary. The fluid can be but is not limited to: fresh water, salt water, brine, an aqueous mixture, a chemical, a food mixture, a liquid mixture, milk, a juice, a soft drink, an alcohol, etc. Many municipalities have water treatment plants that filter and treat drinking water, storm water, waste streams, etc. Many homes and some small businesses have a fresh water and/or a salt water aquarium. Aquariums are manufactured in various sizes from 10 gallons to 1,500 gallons or more. Regardless of the size of the aquarium, all aquariums need the water filtered on a continuous basis.

In some of the above mentioned applications and processes, a portion of the fluid is removed from a container or tank and is routed to a filtering system where foreign particles, debris and/or waste is filtered out of the fluid. In addition, the fluid interacts with biological media to neutralize the harmful chemicals created by organisms in the aquarium. The clean fluid is then reintroduced back into the container or tank or into some part of the application or process. A home aquarium is a good example of one such application where water may be continuously filtered using a filtering system. The filtering system can be hidden from view. Water in the fish aquarium becomes tainted with food particles, algae growth, fish waste, etc. over time. A portion of this water is skimmed off from the upper surface of the water in the aquarium and is routed to a filtering system which is usually situated in a cabinet located below the aquarium or on lower level, such as in the basement. The filtering system can vary in design and construction. Usually, the filtering system has two or more compartments in which a particular filtration task is performed. The filter system can be set up to provide micro particle filtration, biological filtration and aeration.

Now, a baffle tank has been invented along with a method of forming the baffle tank. The baffle tank can take the place of two separate containers. The baffle tank has a first chamber fluidly connected to a second chamber. The first and second chambers are separated by a pair of baffles. The first chamber can be set up to provide biological filtration while the second chamber can retain a pump and a large quantity of clean water which will be pumped back into the aquarium. The pair of baffles prevents debris and micro bubbles from getting into the second chamber. In addition, the pair of baffles ensures that the biological filtration components are always submerged in water.

SUMMARY OF THE INVENTION

Briefly, this invention relates to a baffle tank which can hold a volume of fluid. The baffle tank has a bottom wall joined to at least one sidewall to form an enclosure having a first chamber in fluid communication with a second chamber. The first chamber has a top wall with an enlarged opening formed therein. The first chamber also has an inlet for receiving incoming fluid. The second chamber has a top wall with an enlarged opening formed therein. The second chamber also has an outlet through which fluid can be discharged. A first baffle is formed in the at least one sidewall of the first chamber. This first baffle is joined to at least a portion of a sidewall of the second chamber. The first baffle extends downward from the top walls of the first and second chambers and has a lower end positioned above the bottom wall. A second baffle is formed in the second chamber. The second baffle extends upward from the bottom wall and has an upper end positioned below the top wall of the second chamber. The lower end of the first baffle is located closer to the bottom wall than is the upper end of the second baffle.

A second embodiment relates to a baffle tank which can hold a volume of fluid. The baffle tank has a bottom wall joined to at least one sidewall to form an enclosure having a first chamber in fluid communication with a second chamber. The first chamber has a smaller volume than the second chamber. The first chamber has a top wall with an enlarged opening formed therein. The first chamber also has an inlet for receiving incoming fluid. The second chamber has a top wall with an enlarged opening formed therein. The second chamber also has an outlet through which fluid can be discharged. A first baffle is formed by at least a portion of the sidewall of the first chamber. The first baffle is joined to at least a portion of the sidewall of the second chamber. The first baffle extends downward from the top walls of the first second chambers and has a lower end positioned above the bottom wall. A second baffle is formed in the second chamber which extends upward from the bottom wall and has an upper end positioned below the top wall of the second chamber. The lower end of the first baffle is located closer to the bottom wall than is the upper end of the second baffle.

A method of forming the baffle tank is also taught. The method includes introducing solid plastic pellets into a mold. The plastic pellets are heated in the mold to form a molten substance which is then molded into the baffle tank as described above. The baffle tank is then allowed to at least partially solidify before it is removed from the mold.

The general object of this invention is to provide a baffle tank which can be used in a filtration system and a method of forming the baffle tank. A more specific object of this invention is to provide a baffle tank which is molded into an integral member and has first and second chambers fluidly connected to one another by a pair of baffles.

Another object of this invention is to provide a baffle tank with first and second fluidly connected chambers wherein biological filtration can be performed in the first chamber and the second chamber can serve as a reservoir for clean filtered fluid.

A further object of this invention is to provide a baffle tank having first and second chambers fluidly connected and separated by a pair of baffles, wherein the pair of baffles prevents debris and micro bubbles from flowing into the second chamber.

Still another object of this invention is to provide a baffle tank which can easily fit into a cabinet located below an aquarium.

Still further, an object of this invention is to provide a baffle tank which is relatively inexpensive.

Other objects and advantages of the present invention will become more apparent to those skilled in the art in view of the following description and the accompanying drawings.

DETAILED DESCRIPTION OF THE INVENTION

Figure 1:
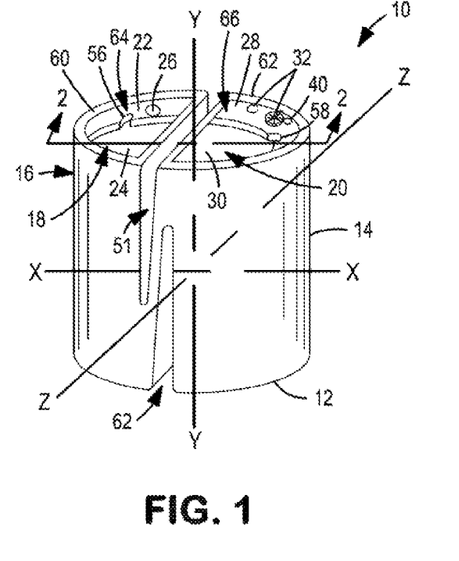
FIG. 1 is a perspective view of a cylindrical baffle tank having first and second chambers fluidly connected by a pair of baffles.
Figure 2:
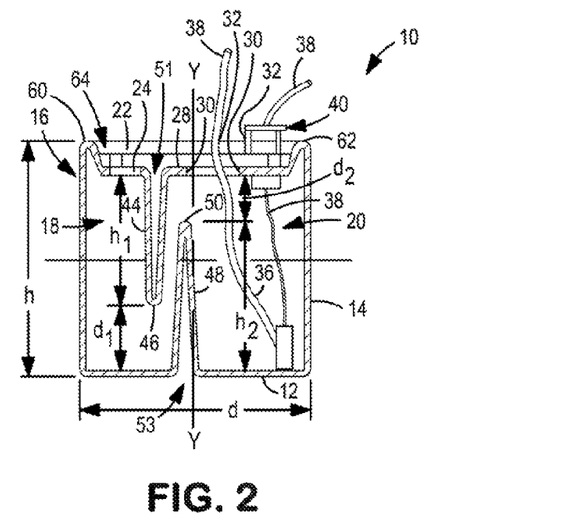
FIG. 2 is a cross-sectional view of FIG. 1 taken along line 2-2.

Referring to FIGS. 1 and 2, a baffle tank 10 is shown for filtering a fluid. The fluid can vary and can be almost any liquid or gas. By "fluid" it is meant a continuous amorphous substance whose molecules move freely past one another and that assumes the shape of its container; a liquid or a gas. The fluid can be but is not limited to: fresh water, salt water, brine, an aqueous mixture, a chemical, a food mixture, a liquid mixture, a gas, milk, a juice, a soft drink, an alcohol, etc. By "brine" it is meant water saturated with or containing large amounts of a salt, especially sodium chloride; the water of a sea or an ocean.

The baffle tank 10 can be used in various commercial, industrial, municipal and residential applications and processes. The baffle tank 10 can be used as part of a filtering system for a fish aquarium. For simplicity, the invention will be explained as filtering water that has become contaminate by food particles, algae, fish feces and/or other foreign objects in a fish aquarium. By "algae" it is meant any of various chiefly aquatic, eukaryotic, photosynthetic organisms, ranging from single-celled forms to the giant kelp.

The baffle tank 10 can vary in size, shape and configuration. In FIGS. 1 and 2, the baffle tank 10 is depicted as a cylinder which is capable of holding a predetermined volume of fluid. The baffle tank 10 is an integral member. By "integral" it is meant a complete unit, a whole. The baffle tank 10 can be constructed in any manner known to those skilled in the art. For example, the baffle tank 10 can be molded as an integral member, can be assembled from individual parts, be cast, be carved from a single member, etc. Desirably, the baffle tank 10 is molded using various molding techniques well known to those skilled in the molding arts. When molded, the baffle tank 10 will exhibit a one piece design with no seams, joins or welds. This is advantageous for it eliminates the possibility of having fluid leak out of the baffle tank 10. A molding apparatus that works well in molding the baffle tank 10 is a rotational mold.

The baffle tank 10 can be formed from various materials. Such materials can include but are not limited to: a plastic, a thermoplastic, a composite, an acrylic, glass, metal, a metal alloy, aluminum, tin, galvanized steel, copper, marine plywood, etc. The baffle tank 10 can be constructed from a single material or from a combination of two or more materials. Desirably, the baffle tank 10 is molded from High Density Polyethylene (HDPE) or High Density Polypropylene (HDPP). Alternatively, the baffle tank 10 can be molded from Low Density Polyethylene (LDPE), Low Density Polypropylene (LDPP). Another option is to mold the baffle tank 10 from other low or high density thermoplastics known to those skilled in the art.

Still referring to FIGS. 1 and 2, the baffle tank 10 has a longitudinal central axis X-X, a vertical central axis Y-Y, and a transverse central axis Z-Z. The baffle tank 10 also has a height h and an outside diameter d. The baffle tank 10 has a bottom wall 12 secured to the sidewall 14 to form an enclosure 16. The bottom wall 12 can be secured to the sidewall 14 in any manner known to those skilled in the art provided a water proof seal is formed. By "waterproof seal" it is meant impervious to or unaffected by water. Molding the baffle tank 10 is most desirable. However, the bottom wall 12 could be secured to the sidewall 14 using glue, an adhesive, a co-adhesive, a heat bond, a pressure bond, a heat and pressure bond, a weld, etc., or a combination of two or more of the aforementioned bonding techniques.

The baffle tank 10 has a first chamber 18 in fluid communication with a second chamber 20. The first chamber 18 can vary in size, shape and configuration. The first chamber 18 can be smaller, equal to or be larger than the second chamber 20. Generally, the first chamber 18 is smaller in volume than the second chamber 20 when the baffle tank 10 is utilized as part of a filtration system for a fish aquarium. One reason for this it that the first chamber 18 can function to hold a high surface area, bacteria culture which can provide biological filtration while the second chamber 20 can function as a reservoir where clean water is retained until it is pumped back into the aquarium. A second chamber 20 should be capable of holding a large volume of fluid. Generally, but not necessarily, the second chamber 20 is larger than the first chamber 18.

The first chamber 18 has a top wall 22 with an enlarged opening 24 formed therethrough. The enlarged opening 24 can vary in size, shape and configuration. The enlarged opening 24 should be large enough to permit a person's hand to easily pass therethrough.

The first chamber 18 also has an inlet 26 for receiving incoming fluid. The size, shape and configuration of the inlet 26 can vary. The inlet 26 has a diameter that can vary in dimension. The inlet 26 can be about 1.5 inches in diameter. Alternatively, the inlet 26 can have a diameter that is smaller or larger and about 1.5 inches. One end of a conduit (not shown), such as a tube, hose or pipe, is connected to the inlet 26 while the opposite end of the conduit is connected to an aquarium (not shown). A portion of the water in the aquarium, which may contain foreign debris, particle or food contamination, feces, etc., can be routed to the baffle tank 10.

It should be understood that some filter systems may employ one or more tanks, or other inline systems, upstream of the baffle tank 10. For example, a mesh or sock filter may be employed to separate out larger particles or foreign debris from the water before it enters the biological filtration zone in the first chamber 18.

Still referring to FIGS. 1 and 2, the inlet 26 is shown being formed in and extending through the top wall 22. However, the inlet 26 could be formed in and extend through an upper portion of the sidewall 14, if desired. One advantage of forming the inlet 26 in the top wall 22 is that the connection between the conduit and the inlet 26 does not have to be a water tight seal. The baffle tank 10 is not designed to be part of a pressurized filtration system. This means that no water tight seals are required in using the baffle tank 10. This is another advantage because one does not have to rely on water tight seals that can fail over time.

Still referring to FIGS. 1 and 2, the second chamber 20 has a top wall 28 with an enlarged opening 30 formed therethrough. The enlarged opening 30 can vary in size, shape and configuration. The enlarged opening 30 should be large enough to permit a person's hand to easily pass therethrough. The second chamber 20 also has an outlet 32. Desirably, the second chamber 20 has at least two outlets 32, 32. Sometimes, the second chamber 20 has three or more, spaced apart, outlets, 32, 32 and 32. Two outlets 32, 32 are depicted in FIGS. 1 and 2. Each of the two outlets 32, 32 extends through the thickness of the top wall 28. When two or more outlets 32, 32 are present, one outlet 32 can function as a fluid outlet so that the clean water in the second chamber can be pumped out and be directed back into the aquarium. All of the outlet 32, 32 and 32 do not have to be the same size.

Referring to FIG. 2, an electrical pump 34 is depicted positioned in the bottom of the second chamber 20. The electrical pump 34 is submerged in the second chamber and functions to pump clean water, under pressure, through a return conduit 36. Alternatively, the electrical pump 34 could be situated outside of the second chamber 20 but be fluidly connected to the second chamber 20. Another option is to position the electrical pump 34 in a different tank where the water is pumped out of that tank.

The return conduit 36 can be a flexible hose or tube. The return conduit 36 can vary in diameter. Usually, the diameter of the return conduit 36 is about 1 inch or less. Desirably, the diameter of the return conduit 36 is about 0.5 inches. The return conduit 36 passes through one of the outlet 32 and is fluidly connected at its opposite end to the aquarium. The outside diameter of the return conduit 36 is approximately equal to the inner diameter of the outlet 32 so as to avoid evaporation of water from the second chamber 20. By "evaporate" it is meant to convert or change into a vapor.

Figure 3:
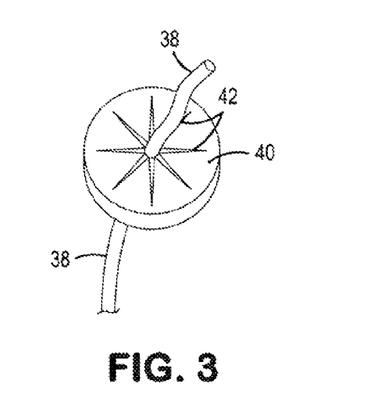
FIG. 3 is a perspective view of a grommet having a plurality of slits which allow an electrical cord to pass therethrough.

Referring now to FIG. 3, the pump 34 has an electrical cord 38 that supplies electricity to operate the pump 34. The electrical cord 38 can pass through a second of the outlets 32, 32. The second outlet 32 can be covered with a grommet 40. By "grommet" it is meant a reinforced member through which an electrical cord can pass. The grommet 40 can be formed from a pliable and/or flexible material, such as rubber. Desirably, the grommet 40 is formed as a thin rubber membrane which completely closes the outlet 32. The grommet 40 can contain one or more narrow slits 42. The slits 42 can be radially aligned like the spokes on a wheel. The slits 42 can intersect one another. The slits allow the electrical cord to pass through the grommet 40. Alternatively, one or more small apertures could be formed through the grommet 40 which are sized to allow one or more electrical cords 38, hoses or tubing to easily pass therethrough. The grommet 40 can vary in diameter. The grommet 40 can have a diameter of less than about 3 inches, about 3 inches, or more than 3 inches. The outlet 32 covered by the grommet 40 can be larger than the outlet 32 through which fluid is returned to the aquarium. The grommet 40 functions to block off a substantial portion of the outlet 32. Such a design limits the amount of clean water that can evaporate from the second chamber 20.

Referring again to FIG. 2, the baffle tank 10 has a height h which can vary in dimension. The height h can range from between about 12 inches to about 40 inches when the baffle tank 10 is used as part of the filter system for a fish aquarium. Desirably, the height h can range from between about 14 to about 30 inches when the baffle tank 10 is used as part of the filter system for a fish aquarium. More desirably, the height h can range from between about 15 to about 25 inches when the baffle tank 10 is used as part of the filter system for a fish aquarium. Even more desirably, the height h can range from between about 16 to about 20 inches when the baffle tank 10 is used as part of the filter system for a fish aquarium. The reason for this range of dimensions is that many filter systems for aquariums are situated within a wooden or metal cabinet located below the aquarium. Sometimes, the aquarium rest on this cabinet such that the cabinet provides support for the aquarium. The cabinet can be designed and constructed to appear similar to a fine piece of furniture having one or more doors. The doors can be sliding door, hinged doors, or any kind of door known to those skilled in the art. The cabinet may also be decorated or include fancy trim pieces and may include a canopy which adds a finishing touch to the cabinet. By placing the filter system within the cabinet, one can hide the filter system yet have easy access to it through the doors.

The baffle tank 10 further includes a first baffle 44. The first baffle 44 is integrally formed by at least a portion of the sidewall 14 of the first chamber 18. By "baffle" it is meant a static device that regulates the flow of a fluid. The first baffle 44 is secured to at least a portion of the sidewall 14 which also forms the second chamber 20. Desirably, the first baffle 44 extends across the inner diameter or interior of the baffle tank 10. The first baffle 44 extends downward from the top walls 22 and 28 of the first and second chambers, 18 and 20 respectively. The first baffle 44 has a lower end 46 positioned above the bottom wall 12. The first baffle 44 has a height $h_1$. The height $h_1$ of the first baffle 44 can vary. The height $h_1$ of the first baffle 44 can range from between about 6 inches to about 15 inches when the baffle tank 10 is used as part of the filter system for a fish aquarium. Desirably, the height $h_1$ of the first baffle 44 can range from between about 7 to about 14 inches when the baffle tank 10 is used as part of the filter system for a fish aquarium. More desirably, the height $h_1$ of the first baffle 44 can range from between about 8 to about 12 inches when the baffle tank 10 is used as part of the filter system for a fish aquarium. Even more desirably, the height $h_1$ of the first baffle 44 can range from between about 9 to about 11 inches when the baffle tank 10 is used as part of the filter system for a fish aquarium.

In other words, the distance the lower end 46 of the first baffle 44 is positioned above the bottom wall 12 can vary. For a baffle tank 10 having a height h of about 18 inches, the first baffle 44 should extend downward from the top wall 22 of the first chamber 18 a distance equal to at least about 50% of the height h of the baffle tank 10. Alternatively, the first baffle 44 could extend downward from the top wall 22 of the first chamber 18 a distance equal to at least about 60% of the height h of the baffle tank 10. Still, in another alternative, the first baffle 44 could extend downward from the top wall 22 of the first chamber 18 a distance equal to at least about 65% of the height h of the baffle tank 10. In a further alternative, the first baffle 44 could extend downward from the top wall 22 of the first chamber 18 a distance equal to at least about 70% of the height h of the baffle tank 10.

A third way of stating this is to say that the lower end 46 of the first baffle 44 should be spaced at least about 1 inch, or less, away from the bottom wall 12 when the baffle tank 10 is used as part of a filter system for a fish aquarium. Alternatively, the lower end 46 of the first baffle 44 could be spaced at least about 2 inches away from the bottom wall 12 when the baffle tank 10 is used as part of a filter system for a fish aquarium. Still, in another alternative, the lower end 46 of the first baffle 44 could be spaced at least about 3 inches away from the bottom wall 12 when the baffle tank 10 is used as part of a filter system for a fish aquarium. In a further alternative, the lower end 46 of the first baffle 44 could be spaced at least about 4 inches away from the bottom wall 12 when the baffle tank 10 is used as part of a filter system for a fish aquarium.

Still referring to FIG. 2, the baffle tank 10 further includes a second baffle 48. The second baffle 48 is integrally formed with at least a portion of the sidewall 14 of the second chamber 20. The second baffle 48 is completely formed within the second chamber 20. The second baffle 48 extends across the inner diameter or interior of the baffle tank 10. The second baffle 48 extends upward from the bottom wall 12 and has an upper end 50 positioned below the top wall 28 of the second chamber 20. The second baffle 48 is also aligned approximately parallel to the first baffle 44. Desirably, the second baffle 48 is aligned parallel to the first baffle 44. The second baffle 48 is spaced apart from the first baffle 44. The distance the first and second baffles, 44 and 48 respectively, are spaced apart from one another can vary. Typically, the first and second baffles, 44 and 48 respectively, can be spaced at least about 0.5 inches apart when the baffle tank 10 is used as part of a filter system for a fish aquarium. Desirably, the first and second baffles, 44 and 48 respectively, can be spaced at least about 1 inch apart when the baffle tank 10 is used as part of a filter system for a fish aquarium. More desirably, the first and second baffles, 44 and 48 respectively, can be spaced at least about 2 inches apart when the baffle tank 10 is used as part of a filter system for a fish aquarium. Even more desirably, the first and second baffles, 44 and 48 respectively, can be spaced more than about 2 inches apart when the baffle tank 10 is used as part of a filter system for a fish aquarium.

The second baffle 48 has a height $h_2$. The height $h_2$ of the second baffle 48 can vary. The height $h_2$ of the second baffle 48 can be less than, equal to or be greater than the height $h_1$ of the first baffle 44. Desirably, the height $h_2$ of the second baffle 48 is equal to or greater than the height $h_1$ of the first baffle 44. More desirably, the height $h_2$ of the second baffle 48 is equal to the height $h_1$ of the first baffle 44.

The height $h_2$ of the second baffle 48 can range from between about 6 inches to about 15 inches when the baffle tank 10 is used as part of a filter system for a fish aquarium. Desirably, the height $h_2$ of the second baffle 48 can range from between about 7 to about 14 inches when the baffle tank 10 is used as part of a filter system for a fish aquarium. More desirably, the height $h_2$ of the second baffle 48 can range from between about 8 to about 12 inches when the baffle tank 10 is used as part of a filter system for a fish aquarium. Even more desirably, the height $h_2$ of the second baffle 48 can range from between about 9 to about 11 inches when the baffle tank 10 is used as part of a filter system for a fish aquarium.

In other words, the distance the upper end 50 of the second baffle 48 is positioned below the top wall 28 can vary. For a baffle tank 10 having a height h of about 18 inches, the second baffle 48 should extend upward from the bottom wall 12 of the second chamber 20 a distance equal to at least about 50% of the height h of the baffle tank 10. Alternatively, the second baffle 48 could extend upward from the bottom wall 12 of the second chamber 20 a distance equal to at least about 60% of the height h of the baffle tank 10. Still, in another alternative, the second baffle 48 could extend upward from the bottom wall 12 of the second chamber 20 a distance equal to at least about 65% of the height h of the baffle tank 10. In a further alternative, the second baffle 48 could extend upward from the bottom wall 12 of the second chamber 20 a distance equal to at least about 70% of the height h of the baffle tank 10.

A third way of stating this is to say that the upper end 50 of the second baffle 48 should be spaced at least about 1 inch away from the top wall 28 when the baffle tank 10 is used as part of the filter system for a fish aquarium. Alternatively, the upper end 50 of the second baffle 48 could be spaced at least about 2 inches away from the top wall 28 when the baffle tank 10 is used as part of the filter system for a fish aquarium. Still, in another alternative, the upper end 50 of the second baffle 48 could be spaced at least about 3 inches away from the top wall 28 when the baffle tank 10 is used as part of the filter system for a fish aquarium. In a further alternative, the upper end 50 of the second baffle 48 could be spaced at least about 4 inches away from the top wall 28 when the baffle tank 10 is used as part of the filter system for a fish aquarium.

Figure 8:
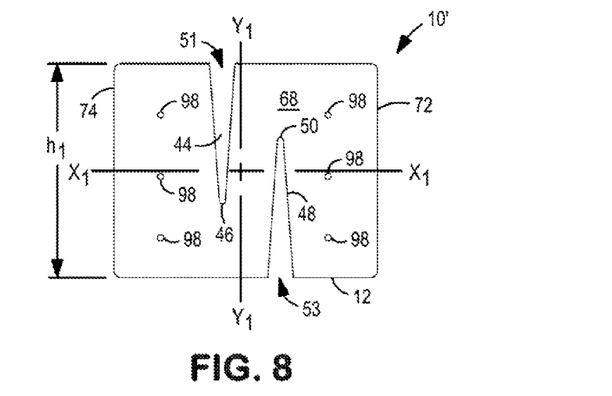
FIG. 8 is a front view of the baffle tank shown in FIG. 6.

Referring now to FIGS. 1 and 8, when viewed from the front, the first baffle 44 forms a V-shaped groove 51 in the exterior surface of the baffle tank 10. The first baffle 44 extends downward from the top walls 22 and 28. Therefore, the V-shaped groove 51 extends down from at least one of the top walls 22 and 28. Desirably, the V-shaped groove 51 extends down from both of the top walls 22 and 28. The first baffle 44 also forms a portion of a sidewall to the first chamber 18 and a portion of a sidewall to the second chamber 20. The sides of the first baffle 44 can be slightly bowed outward so that they exhibit a convex configuration. By "bow" it is meant bent, curved or arched. This slight bow facilitates removing the baffle tank 10 from the mold. The second baffle 48 forms an inverted V-shaped groove 53 in the baffle tank 10. The second baffle 48 extends upward from the bottom wall 12. Therefore, the inverted V-shaped groove 53 extends up from the bottom wall 12. The sides of the second baffle 48 can also be slightly bowed outward so that they exhibit a convex configuration. This slight bow facilitates removing the baffle tank 10 from the mold.

The pair of V-shaped grooves 51 and 53 provides the baffle tank 10 with a unique visual exterior appearance. The pair of V-shaped grooves 51 and 53 can be equal in size and appearance or can differ in size and appearance. Desirably, the pair of V-shaped grooves 51 and 53 is identical in size and appearance.

Referring again to FIG. 1, one can clearly see that the pair of V-shaped grooves 51 and 53 extends completely across the outside diameter d of the baffle tank 10.

In order to function properly and maintain a predetermined fluid (water) level in the first chamber 18, the lower end 46 of the first baffle 44 is located closer to the bottom wall 12 than is the upper end 50 of the second baffle 48. The fluid (water) level in the first chamber 18 will be dictated by the location of the upper end 50 of the second baffle 48 assuming sufficient fluid has been introduced into the first chamber 18. A basket or container, not shown, filled with a plurality of small, high surface area members, such as ceramic spherical balls, can be placed in the first chamber 18 to create a bacteria culture for biological filtration. By "ceramic" it is meant any of various hard, brittle, heat and corrosion resistant materials made by shaping and then firing a nonmetallic mineral, such as clay, at a high temperature. The incoming contaminated fluid (water) from the aquarium is directed downward so that it passes around and between these ceramic spherical balls. This action cleanses the contaminated fluid (water) of bacteria and other harmful chemicals, for example ammonia can be converted to less dangerous elements. The unique structure of the first and second baffles, 44 and 48 respectively, ensures that any basket or container, filled with such bacteria culture, and present in the first chamber 18 will be at least partially submerged in the fluid (water). This will be true even if the fluid (water) level in the second chamber 20 goes down due to evaporation or some other reason. In order for the biological filtration to work properly, the bacteria culture should be at least partially submerged in a fluid (water). Desirably, the bacteria culture should be completely submerged in a fluid (water).

Some filtration systems utilize one or more upper baskets of media that are not be submerged in fluid (water). This is called a wet/dry configuration and is considered very desirable because increased aeration accelerates the filtering process. Such a filtration system could be employed in the first chamber 18 of the baffle tank 10.

It should be understood that the biological media can be made from ceramic, clay, plastic or some other material. The biological media can vary in size, shape and configuration. In addition, the baskets (not shown can house one or more filtration pads, activated carbon, purigen, filter floss or some other type of filter media.

Still referring to FIG. 2, the lower end 46 of the first baffle 44 is positioned above the bottom wall 12 by a first distance $d_1$ and the upper end 50 of the second baffle 48 is positioned below the top wall 28 of the second chamber 20 by a second distance $d_2$. The first distance $d_1$ can be approximately equal to the second distance $d_2$. Alternatively, the first distance $d_1$ can be greater than the second distance $d_2$. Another alternative is to have the first distance $d_1$ be less than the second distance $d_2$.

Figure 4:
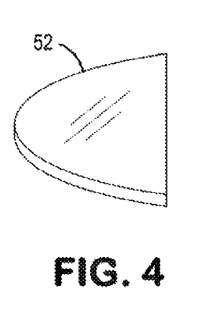
FIG. 4 is a top view of a piece of glass which can cover the enlarged opening formed in the first chamber of the baffle tank.
Figure 5:
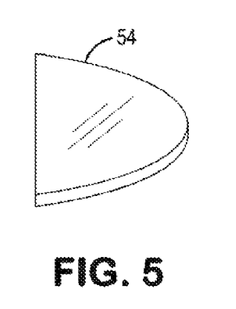
FIG. 5 is a top view of a piece of glass which can cover the enlarged opening formed in the second chamber of the baffle tank.

Referring to FIGS. 4 and 5, first and second pieces of glass, 52 and 54 respectively, are shown. The first piece of glass 52 is sized and shaped to cover the enlarged opening 24 formed in the top wall 22 and cover the first chamber 18. The first piece of glass 52 is removable by lifting it upward and away from the enlarged opening 24. The second piece of glass 54 is sized and shaped to cover the enlarged opening 30 formed in the top wall 28 and cover the second chamber 20. The second piece of glass 54 is removable by lifting it upward and away from the enlarged opening 30. One could use a different material other than glass, if one so desired. However, glass is a very common material that is relatively inexpensive, is resilient to water, comes in different thicknesses, can be cut into various shapes, has a certain weight to it so that it will remain in place on one of the top walls, 22 and 28 respectively, and is washable should it get dirty.

The primary function of the first and second pieces of glass, 52 and 54 respectively, is to slow down, limit or prevent evaporation of fluid (water) from the first and second chambers, 18 and 20 respectively.

The thickness of each of the first and second pieces of glass, 52 and 54 respectively, can vary. When the baffle tank 10 is used as part of the filter system for a fish aquarium, the thickness of each of the first and second pieces of glass, 52 and 54 respectively, can range from between about 0.25 inches to about 0.5 inches. Desirably, the thickness of each of the first and second pieces of glass, 52 and 54 respectively, can range from between about 0.3 inches to about 0.4 inches. More desirably, the thickness of each of the first and second pieces of glass, 52 and 54 respectively, can be about 0.375 inches.

Referring again to FIG. 1, a first finger depression 56 is shown formed in the top wall 22, adjacent to the enlarged opening 24. The first finger depression 56 facilitates removal of the piece of glass 52 from the enlarged opening 24. The finger depression 56 is optional but serves a very useful purpose. The first finger depression 56 can vary in size, shape and configuration but should be large enough to accommodate a person's index finger up to the first knuckle. Likewise, a second finger depression 58 is shown formed in the top wall 28, adjacent to the enlarged opening 30. The second finger depression 56 facilitates removal of the piece of glass 54 from the enlarged opening 30. The second finger depression 58 is again optional but serves a very useful purpose. The second finger depression 58 can vary in size, shape and configuration but should be large enough to accommodate a person's index finger up to the first knuckle.

Still referring to FIGS. 1 and 2, one will notice that the baffle tank 10 has a rim 60 which surrounds the top wall 22 of the first chamber 18 and a rim 62 which surrounds the top wall 28 of the second chamber 20. By "rim" it is meant a border, edge or margin of an object. The rims 60 and 62 function to create wells 64 and 66 in the top walls, 22 and 28 respectively. By "well" it is meant an enclosed space for receiving and holding something, such as a fluid (water). The depth of each well 64 and 66 can vary. Desirably, each of the wells 64 and 66 has the same depth. Alternatively, the well 64 could have a different depth than the well 66. Any incoming fluid (water) that does not pass through the inlet 26 but instead splashes on the top wall 22 of the first chamber 18 can pool in the well 64. This fluid (water) would then be able to flow downward into first chamber 18 via the first finger depression 56. Likewise, any fluid (water) that would accumulate on the top wall 28 of the second chamber 20 can pool in the well 66. This fluid (water) would then be able to flow downward into second chamber 20 via the second finger depression 58.

Referring now to FIGS. 6-12, another embodiment of a baffle tank 10' is shown. Similar numbers are used for identical components as were used in FIGS. 1 and 2. The baffle tank 10' has a longitudinal central axis $X_1$-$X_1$, a vertical central axis $Y_1$-$Y_1$, and a transverse central axis $Z_1$-$Z_1$. The baffle tank 10' also has length l, a width w, and a height h. The baffle tank 10' differs from the baffle tank 10, shown in FIGS. 1 and 2, in that it has a rectangular configuration. This means that the baffle tank 10' will have at least four side walls 68, 70, 72 and 74. The side wall 68 is the front of the baffle tank 10' and the sidewall 70 is back of the baffle tank 10'. The sidewalls 72 and 74 are the other two outer most sidewalls of the baffle tank 10'.

The baffle tank 10' also has a first baffle 44 which extends downward to a lower end 46 as it approaches the bottom wall 12, and a second baffle 48 which extends upward to an upper end 50 as it approaches the top wall 28 of the second chamber 20. When viewed from the exterior, the first baffle 44 forms a V-shaped groove 51 in the baffle tank 10'. The first baffle 44 extends downward from the top walls 22 and 28 of the first and second chambers, 18 and 20 respectively. The first baffle 44 also forms a sidewall to the first chamber 18 and a sidewall to the second chamber 20. The second baffle 48 forms an inverted V-shaped groove 53 in the baffle tank 10'. The second baffle 48 extends upward from the bottom wall 12. The pair of V-shaped grooves 51 and 53 provides the baffle tank 10' with a unique visual exterior appearance. The pair of V-shaped grooves 51 and 53 can be equal in size and appearance or can differ in size and appearance. Desirably, the pair of V-shaped grooves 51 and 53 is identical in size and appearance. Each of the pair of V-shaped grooves 51 and 53 actually creates two more sidewalls in the baffle tank 10'.

Referring again to FIGS. 6, 9 and 11, one can clearly see that the V-shaped grooves 51 and 53 extend completely across the width w of the baffle tank 10'. This means that the first and second baffles, 44 and 48 respectively, are integral with the baffle tank 10'. In addition, the first baffle 44 creates a sidewall for the first chamber 18 and a sidewall for the second chamber 20. The second baffle 48 is completely within the second chamber 20.

The invention relates to a baffle tank 10 or 10' having at least one sidewall. This means that the cross-sectional shape of the baffle tank can vary. The baffle tank can have one sidewall which could give it a circular, cross-sectional shape. The baffle tank could have two sidewalls, with each sidewall being bowed outward, so that the baffle tank has a cross-sectional shape resembling an oval or a football. The baffle tank could also have three sidewalls, with the three sidewalls arranged to give the baffle tank a triangular cross-sectional shape. With four sidewalls, the baffle tank could have a square or rectangular cross-sectional shape. With five sidewalls, the baffle tank could have a pentagon cross-sectional shape, etc. Additional sides will create other known shapes.

Figure 6:
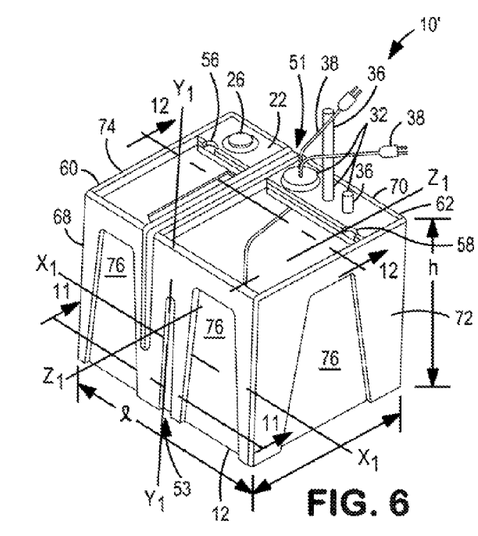
FIG. 6 is a perspective view of a rectangular baffle tank having first and second chambers fluidly connected by a pair of baffles.
Figure 9:
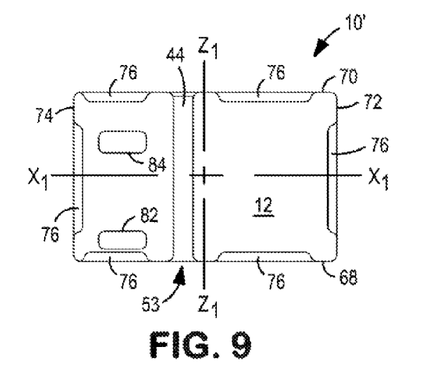
FIG. 9 is a bottom view of the baffle tank shown in FIG. 6.
Figure 11:
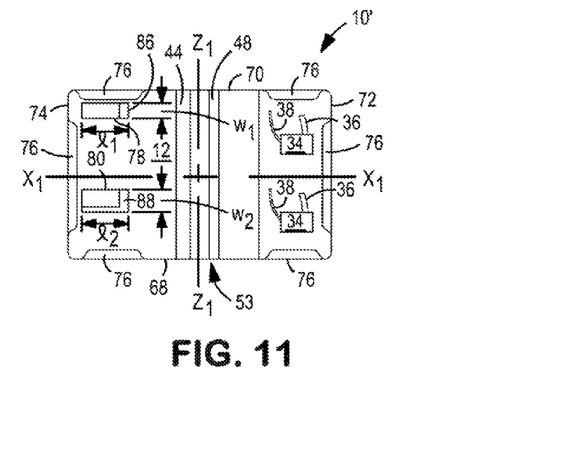
FIG. 11 is a cross-sectional view of the baffle tank shown in FIG. 6 taken along line 11-11.

Referring to FIGS. 6, 9 and 11, one will notice that each of the sidewalls 68, 70, 72 and 74 of the baffle tank 10' is depicted as having one or more structural members 76 to give it extra strength, integrity, rigidity and/or support. Alternatively, at least one of the sidewalls 68, 70, 72 and 74 of the baffle tank 10' could have one or more structural members 76. Still another alternative is not to employ any structural members 76. When present, each of the structural members 76 can vary in size, shape and configuration. The structural members 76 are depicted as having a trapezoid shape. By "trapezoid" it is meant a quadrilateral having two parallel sides. Each structural member 76 is shown as being a large indentation formed in each of the sidewalls 68, 70, 72 and 74. However, it should be understood that each of the structural members 76 could be made to protrude outward from one or more of the sidewalls 68, 70, 72 and 74 and provide the same structural support. Another alternative is to make the sidewalls 68, 70, 72 and 74 of the baffle tank 10' thicker so that the structural members 76 are not needed.

The pair of V-shaped grooves 51 and 53 is not shown having a structural member 76. However, if needed, the sidewalls created by the V-shaped grooves 51 and 53 could also contain a structural member 76.

The front sidewall 68 and the back sidewall 70 each contain two structural members 76, 76 which are arranged side by side. If one desired, multiple structural members 76 could be utilized as well. The two outer sidewalls 72 and 74 each contain one structural member 76 which is larger in overall size. Again, one could form multiple structural members 76 in each of these sidewalls 72 and 74, if one so desired. The structural members 76 in each of the sidewalls 68, 70, 72 and 74 taper inward as they extend upward from the bottom wall 12 towards one of the top walls, 22 and 28. However, it should be understood that the structural members 76 could taper in an opposite direction, if desired. In fact, the structural members 76 could have any conceivable configuration known to man that would increase the strength, integrity, rigidity and/or support of the baffle tank 10'.

Referring again to FIGS. 6 and 12, the baffle tank 10' also differs from the baffle tank 10 in that it has three outlets 32, 32 and 32, instead of two outlets 32, 32, formed in the top wall 28 of the second chamber 20. The presence of the three outlets 32, 32 and 32 allows one to place two pumps 34, 34, see FIG. 11, in the second chamber 20. The use of two pumps 34, 34 is desirably in large aquariums because if one pump 34 fails, the filter system will still be able to operate. Therefore, two return conduits 36, 36, one from each pump 34, 34, will pass through two of the outlets 32, 32. Each of the return conduits 36, 36 will form a snug or tight fit with the inner diameter of each of the outlets 32, 32. Usually, the return conduits 36, 36 have an outside diameter of about 1 inch or less. Desirably, the return conduits 36, 36 have an outside diameter of about 0.5 inches. Therefore, each of the two outlets 32, 32 can have a 0.5 inch inside diameter.

Figure 12:
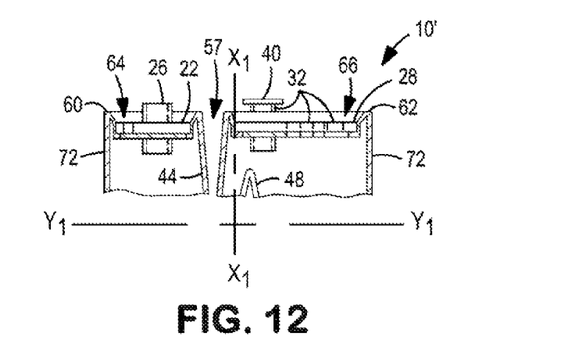
FIG. 12 is a cross-sectional view of the baffle tank shown in FIG. 6 taken along line 12-12.

The third outlet 32 contains a grommet 40 as was explained above in relation to FIGS. 1 and 2. One will notice that two electrical cords 38, 38 extend through the slits or apertures 42 formed in the grommet 40. The grommet 40 is designed to allow one or more electrical cords 38, and/or one or more hoses or tubing to easily pass therethrough. Sometimes another device, such as a heater, an ultraviolet light device or some other mechanism, is positioned within the second chamber 20 of the baffle tank 10'. Since space may be limited, the second chamber 20 is a good place to position these extra devices. The electrical cords and/or hoses or tubing from these extra devices can be routed through the slits or apertures 42 formed in the grommet 40.

Figure 7:
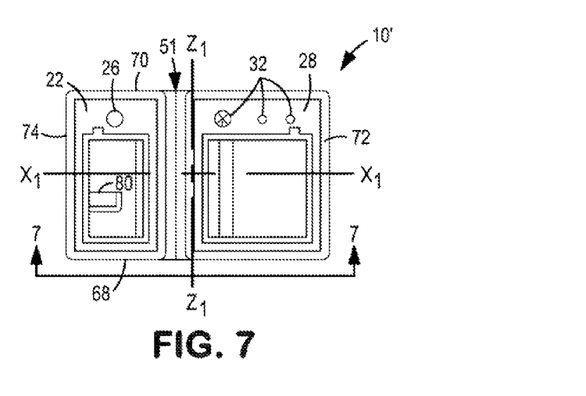
FIG. 7 is a top view of the baffle tank shown in FIG. 6.

Referring now to FIGS. 7 and 11, the baffle tank 10' further differs from the baffle tank 10 in that it contains first and second abutments 78 and 80 in the first chamber 18. The first and second abutments, 78 and 80 respectively, can vary in size, shape and configuration. The abutments 78 and 80 can be molded into the baffle tank 10' as it is being formed. This means that the first and second abutments, 78 and 80 respectively, are integral with the baffle tank 10'. Alternatively, the first and second abutments, 78 and 80 respectively, could be formed after the baffle tank 10' is formed or molded. The first abutment 78 is spaced apart from the second abutment 80. The distance between the two abutments 78 and 80 can vary depending upon the size of the baffle tank 10'. For a baffle tank 10' having a width w of about 16 inches, the distance between the first and second abutments, 78 and 80 respectively, could be about 6 inches or more. Desirably, for a baffle tank 10' having a width of about 16 inches, the distance between the first and second abutments, 78 and 80 respectively, could be about 7 inches or more. More desirably, for a baffle tank 10' having a width of about 16 inches, the distance between the first and second abutments, 78 and 80 respectively, could be at least about 8 inches.

Referring now to FIG. 9, when the abutments 78 and 80 are molded simultaneously with the baffle tank 10', a pair of recesses 82 and 84 can be created in the exterior, bottom wall 12 of the baffle tank 10'. The recesses 82 and 84 decrease the amount of material that is needed to form the first and second abutments, 78 and 80 respectively. By forming the first and second abutments, 78 and 80 respectively, as hollow members, one can decrease the overall weight of the baffle tank 10'.

Alternatively, the first and second abutments, 78 and 80 respectively, could be separate members that are affixed or secured to the interior of the bottom wall 12 after the baffle tank 10' is formed.

Referring again to FIG. 11, the first and second abutments, 78 and 80 respectively, are optional members that do not have to be present. However, the first and second abutments, 78 and 80 respectively, do serve a useful purpose. The first and second abutments, 78 and 80 respectively, can vary in size, shape and configuration. In addition, one could utilize more than the two abutments 78 and 80, if needed. The first and second abutments, 78 and 80 respectively, can be of equal size or be of a different size. In FIG. 11, the first abutment 78 is shown to having a length $l_1$ and a width $w_1$. The length $l_1$ is aligned parallel to the longitudinal central axis $X_1$-$X_1$ of the baffle tank 10' and the width $w_1$ is aligned parallel to the transverse central axis $Z_1$-$Z_1$ of the baffle tank 10'. Other arrangements are also possible. The length $l_1$ and the width $w_1$ of the first abutment 78 can vary. The length $l_1$ of the first abutment 78 can range from about 4 inches to about 7 inches when the baffle tank 10' is used as part of the filter system for a fish aquarium. Desirably, the length $l_1$ of the first abutment 78 is from between about 5 inches to about 6 inches. More desirably, the length $l_1$ of the first abutment 78 is about 5.5 inches. The width $w_1$ of the first abutment 78 can range from between about 1 inch to about 3 inches when the baffle tank 10' is used as part of the filter system for a fish aquarium. Desirably, the width $w_1$ of the abutment 78 is about 2 inches. A shoulder 86 is formed on the top of the first abutment 78, adjacent to the end located farthest away from the sidewall 74. The shoulder 86 can span across the width $w_1$ of the first abutment 78 and have a length of about 1 inch measured parallel to the length $l_1$ of the first abutment 78.

Still referring to FIG. 11, the second abutment 80 is shown to having a length $l_2$ and a width $w_2$. The length $l_2$ is aligned parallel to the longitudinal central axis $X_1$-$X_1$ of the baffle tank 10' and the width $w_2$ is aligned parallel to the transverse central axis $Z_1$-$Z_1$, of the baffle tank 10'. Other arrangements are also possible. The length $l_2$ and the width $w_2$ of the second abutment 80 can vary. The length $l_2$ of the second abutment 80 can range from about 4 inches to about 7 inches when the baffle tank 10' is used as part of the filter system for a fish aquarium. Desirably, the length $l_2$ of the second abutment 80 is from between about 5 inches to about 6 inches. More desirably, the length $l_2$ of the second abutment 80 is about 5.5 inches. The width $w_2$ of the second abutment 80 can range from between about 1 inch to about 4 inches when the baffle tank 10' is used as part of the filter system for a fish aquarium. Desirably, the width $w_2$ of the second abutment 80 is about 3 inches. One will notice that the second abutment 80 is wider than the first abutment 78. The purpose for this will be explained shortly. An L-shaped shoulder 88 is formed on the top of the second abutment 80. The L-shaped shoulder 86 can extend across the length $l_2$ and the width $w_2$ of the second abutment 80. The thickness of the L-shaped shoulder 88 can be about 1 inch or less.

Figure 13:
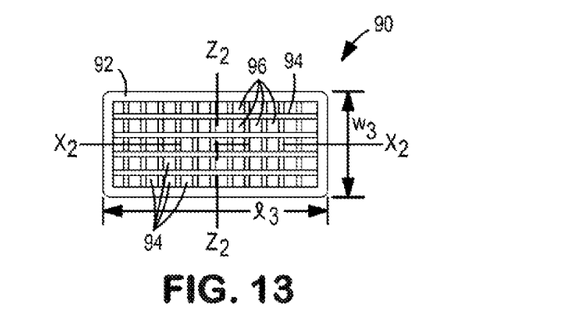
FIG. 13 is a top view of a basket which can rest on the abutments formed in the first chamber of the baffle tank.
Figure 14:
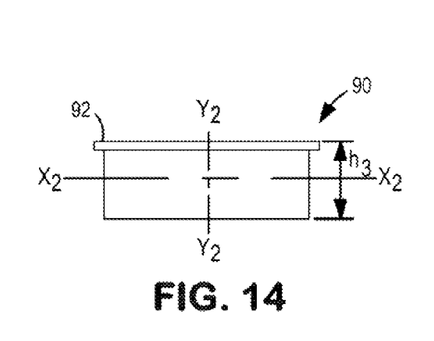
FIG. 14 is a side view of the basket shown in FIG. 13.

Referring now to FIGS. 13 and 14, the first and second abutments, 78 and 80 respectively, function as support for one or more baskets 90. When two or more baskets 90 are present, they can be stacked vertically, one on top on another in a nesting relationship. One, two, three, four, five, six or more basket(s) 90 can be utilized depending upon their size, shape and configuration, and the overall height of the baffle tank 10'. A rectangular basket 90 is shown in FIGS. 13 and 14. The basket(s) 90 can vary in size, shape and configuration. The basket(s) 90 can be constructed from various materials. Plastic is a good material from which to construct the basket(s) 90 because plastic is easily molded, is relatively inexpensive, is light weight, and will not rust or corrode when immersed in water.

The basket 90 has a length $l_3$, a width $w_3$ and a height $h_3$, all of which can vary. The length $l_3$ can range from between about 2 inches to about 20 inches depending on the size of the baffle tank 10'. A length $l_3$ of from between about 3 inches to about 12 inches works well for a baffle tank 10' having a width of about 16 inches. The width $w_3$ can range from between about 1 inch to about 6 inches depending on the size of the baffle tank 10'. A width $w_3$ of from between about 2 inches to about 5 inches works well for a basket 90 having a length $l_3$ of less than about 12 inches. The height $h_3$ can range from between about 1 inch to about 4 inches depending on the size of the baffle tank 10'. A height $h_3$ of from between about 1.5 inches to about 3 inches works well for a basket 90 having a length $l_3$ of less than about 12 inches.

Still referring to FIGS. 13 and 14, the basket 90 has an upper lip 92 that extends completely around it outer perimeter. The width and thickness of the lip can vary. A width of about 0.25 inches or less and a thickness of about 0.125 inches or less, works well. The basket 90 also has a bottom 94 with multiple openings 96 formed therethrough. The openings 96 can vary in size and shape. Desirably, all of the openings 96 are of the same size or diameter. Alternatively, the openings could vary in size from one another. The openings 96 are shown in FIG. 13 as square openings, although they could be circular. The openings 96 can be formed by various ways known to those skilled in the art. The openings 96 can be formed when the basket 90 is molded. Alternatively, the four sidewalls of the basket 90 could be formed and then a screen (not shown) could be attached to the sidewall to form a perforated bottom 94.

The basket 90 is sized, shaped and configured to span across the pair of first and second abutments, 78 and 80 respectively. The shoulder 86 formed on the first abutment 78 and the L-shaped shoulder 88 formed on the second abutment 80 serve to hold the lower most basket 90 stationary so that it will not move as a fluid (water) is introduced into the first chamber 18. The nesting relationship between two or more vertically stacked baskets 90, 90 will cause all of the baskets 90, 90 to remain stationary.

Each basket 90 will hold a plurality of small, high surface area members. The high surface area members are sometimes referred to as the biological filtration media. The high surface area members can vary in size, shape and configuration. The high surface area members can be formed from various materials, as was explained above. For example, the high surface area members can be spherical balls of ceramic. The high surface area members create a bacteria culture for biological filtration in the first chamber 18. Optionally, an open cell foam member (not shown) and/or a perforated plate (not shown) can be placed in the upper most basket 90 to help prevent debris and other refuse from contacting the high surface area members retained in the one or more of the baskets 90. A stack of two or more baskets 90, 90 can be used. A stack of the baskets 90,90 is sometimes referred to as a "media stack" or a "biological filtration stack" by those in the filtering business.

Figure 10:
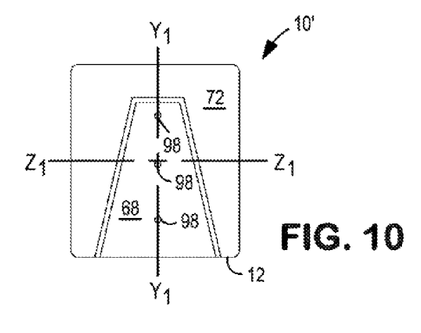
FIG. 10 is a right side view of the baffle tank shown in FIG. 6.

Referring now to FIGS. 8 and 10, the baffle tank 10' further differs from the baffle tank 10 in that it contains at least one pre-formed pilot dimple 98. The pre-formed pilot dimples 98 serve as measured locations where openings can be drilled or created into the baffle tank 10' such that connecting hoses can be attached in a horizontal alignment between the baffle tank 10' and another tank in the filter system. When connecting hoses between adjacent tanks, sometimes it is critical that a hose be attached on the same horizontal plane between the two tanks. The pre-formed pilot dimples 98 provide an easy and convenient way for this to be accomplished. The pre-formed pilot dimples 98 can be formed anywhere in the exterior surface of the baffle tank 10'. Desirably, the pre-formed pilot dimples 98 are formed in the front sidewall 68, in the back sidewall 70, in one of the remaining two outermost sidewalls 72 and 74 or in one or both of the top walls 22 and 28.

FIG. 8 shows six, spaced apart pre-formed pilot dimples 98, 98, 98, 98, 98 and 98. Three of the pre-formed pilot dimples 98, 98 and 98 are situated adjacent to the first chamber 18 and the other three pre-formed pilot dimples 98, 98 and 98 are situated adjacent to the second chamber 20. The various pre-formed pilot dimples 98, 98, 98 can be situated at different heights in the baffle tank 10'.

In FIG. 10, three pre-formed pilot dimples 98, 98 and 98 are shown formed in the sidewall 72. Each of the pre-formed pilot dimples 98 facilitates drilling or forming a larger size opening in the baffle tank 10'. The pre-formed pilot dimples 98 can be molded into the baffle tank 10' when it is being molded or the pre-formed pilot dimples 98 can be bored partially into the sidewall 68, 70, 72 and 74, or into the top walls 22 and 28 after the baffle tank 10' has been formed. Each of the pre-formed pilot dimples 98 has a diameter of about 0.5 inches or less. Desirably, each of the pre-formed pilot dimples 98 has a diameter of about 0.25 inches or less. The depth of each of the pre-formed pilot dimples 98 can vary. A depth of less than about 0.3 inches for each pre-formed pilot dimple 98 is sufficient when the thickness of the sidewalls 68, 70, 72 and 74 and the top walls 22 and 28 of the baffle tank 10' are less than about 1 inch.

Figure 15:
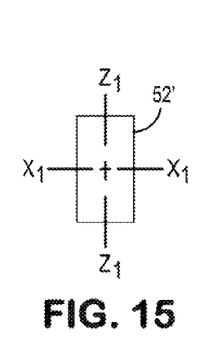
FIG. 15 is a top view of a piece of glass which can cover the enlarged opening formed in the first chamber of the baffle tank.
Figure 16:
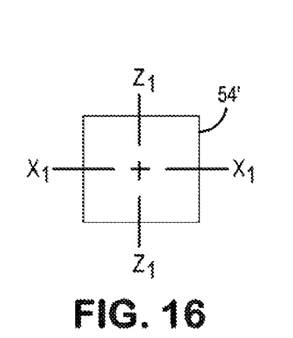
FIG. 16 is a top view of a piece of glass which can cover the enlarged opening formed in the second chamber of the baffle tank.

Referring now to FIGS. 15 and 16, first and second pieces of glass, 52' and 54' respectively, are shown. The first and second pieces of glass 52' and 54' can vary in shape. For discussion purposes only, the first and second pieces of glass 52' and 54' are shown as being rectangular. The first piece of glass 52' is sized and shaped to cover the enlarged opening 24 formed in the top wall 22 and cover the first chamber 18. The first piece of glass 52' is removable by lifting it upward and away from the enlarged opening 24. The second piece of glass 54' is sized and shaped to cover the enlarged opening 30 formed in the top wall 28 and cover the second chamber 20. The second piece of glass 54' is removable by lifting it upward and away from the enlarged opening 30. The first and second finger depressions, 56 and 58 respectively, can be used to easily lift the first and second pieces of glass, 52' and 54' respectively, from its enlarged opening, 24 and 30 respectively.

One could use a different material other than glass, if one so desired. However, glass is a very common material that is relatively inexpensive, is resilient to water, comes in different thicknesses, can be cut to different sizes, has a certain weight to it so that it will remain in place on one of the top walls 22 and 28, and is washable should it get dirty.

The primary function of the first and second pieces of glass, 52' and 54' respectively, is to slow down, limit or prevent evaporation of fluid (water) from the first and second chambers, 18 and 20 respectively. The thickness of each of the first and second pieces of glass, 52' and 54' respectively, can vary. When the baffle tank 10' is used as part of a filter system for a fish aquarium, the thickness of each of the first and second pieces of glass, 52' and 54' respectively, can range from between about 0.25 inches to about 0.5 inches. Desirably, the thickness of each of the first and second pieces of glass, 52 and 54 respectively, can range from between about 0.3 inches to about 0.4 inches. More desirably, the thickness of each of the first and second pieces of glass, 52 and 54 respectively, can be about 0.375 inches.

It should be understood that a set of lights can be placed on top of at least one of the first and second pieces of glass, 52' and 54' respectively, to aid in growing bacteria, algae or plants inside the baffle tank 10 or 10'.

Method

A method of forming the baffle tank 10 or 10' will now be explained. The method relates to molding a baffle tank 10 or 10' which can hold a volume of fluid. The method includes the steps of introducing solid, plastic or thermoplastic pellets into a mold. The pellets can vary in size, shape and configuration. The pellets can also vary in composition. The pellets could be formed from a high density polymer, such as High Density Polyethylene (HDPE), High Density Polypropylene (HDPP), Low density Polyethylene (LDPE), Low Density Polypropylene (LDPP) or some other material known to those skilled in the art Many other plastics and/or thermoplastics can be molded. The pellets are introduced into a mold. The mold can vary in size, shape, configuration and construction. The mold can be any mold known to those skilled in the molding art. For example, the mold could be a rotational mold. The pellets are heated to an elevated temperature until they become a soft, molten substance. The molten substance is force to take the shape of the mold into which it is introduced and will form the baffle tank 10 or 10'. The baffle tank 10 or 10' is allowed to at least partially solidify before it is removed from the mold. The baffle tank 10 or 10' has a bottom wall 12 joined to at least one sidewall 14 to form an enclosure 16 having a first chamber 18 in fluid communication with a second chamber 20. The first chamber 18 has a top wall 22 with an enlarged opening 24 formed therein. The first chamber 18 also has an inlet 26 for receiving incoming fluid. The second chamber 20 has a top wall 28 with an enlarged opening 30 formed therein. The second chamber 20 also has an outlet 32 through which fluid can be discharged. A first baffle 44 is formed by at least a portion of the sidewall 14 of the first chamber 18. The first baffle 44 is joined to at least a portion of the sidewall 14 of the second chamber 20. The first baffle 44 extends downward from the top wall 22 of the first chamber 18 and the top wall 28 of the second chamber 20. The first baffle 44 has a lower end 46 positioned above the bottom wall 12. A second baffle 48 is formed in the second chamber 20 which extends upward from the bottom wall 12 and has an upper end 50 positioned below the top wall 28 of the second chamber 20. The lower end 46 of the first baffle 44 is located closer to the bottom wall 12 than is the upper end 50 of the second baffle 48. A fluid connection is present between the first and second chambers, 18 and 20 respectively, by the first and second baffles, 44 and 48 respectively.

It should also be understood that the baffle tank 10 or 10' could be made using a cast resin. Such a method is known to those skilled in the art.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A baffle tank which can hold a volume of fluid, comprising: a bottom wall joined to at least one sidewall to form an enclosure having a first chamber in fluid communication with a second chamber, said first chamber having a top wall with an enlarged opening formed therein, said first chamber also having an inlet for receiving incoming fluid, said second chamber having a top wall with an enlarged opening formed therein, said second chamber also having an outlet through which fluid can be discharged, a first baffle formed by at least a portion of said sidewall of said first chamber, said first baffle joined to at least a portion of said sidewall of said second chamber, said first baffle extending downward from said top walls of said first and second chambers and having a lower end positioned above said bottom wall, a second baffle formed in said second chamber which extends upward from said bottom wall and has an upper end positioned below said top wall of said second chamber, and said lower end of said first baffle is located closer to said bottom wall than is said upper end of said second baffle.

2. The baffle tank of claim 1 further comprising an integral enclosure which has an external V-shaped groove and an external inverted V-shaped groove formed therein.

3. The baffle tank of claim 2 wherein said external V-shaped groove extends down from said top wall and said external inverted V-shaped groove extends up from said bottom wall.

4. The baffle tank of claim 1 wherein said lower end of said first baffle is positioned above said bottom wall by a first distance and said upper end of said second baffle is positioned below said top wall of said second chamber by a second distance, and said first distance is approximately equal to said second distance.

5. The baffle tank of claim 1 wherein said lower end of said first baffle is positioned above said bottom wall by a first distance and said upper end of said second baffle is positioned below said top wall of said second chamber by a second distance, and said first distance is greater than said second distance.

6. The baffle tank of claim 1 wherein said lower end of said first baffle is positioned above said bottom wall by a first distance and said upper end of said second baffle is positioned below said top wall of said second chamber by a second distance, and said first distance is less than said second distance.

7. The baffle tank of claim 1 wherein said baffle tank is molded from one of the following: high density polyethylene, high density polypropylene, low density polyethylene or low density polypropylene.

8. The baffle tank of claim 1 wherein said second chamber has at least two outlets formed in said top wall of said second chamber, and one of said at least two outlets contains a grommet through which at least one electrical cord can pass.

9. The baffle tank of claim 1 wherein said first chamber contains a pair of abutments for supporting one or more baskets filled with a biological filtration medium.

10. A baffle tank which can hold a volume of fluid, comprising: a bottom wall joined to at least one sidewall to form an enclosure having a first chamber in fluid communication with a second chamber, said first chamber having a smaller volume than said second chamber, said first chamber having a top wall with an enlarged opening formed therein, said first chamber also having an inlet for receiving incoming fluid, said second chamber having a top wall with an enlarged opening formed therein, said second chamber also having an outlet through which fluid can be discharged, a first baffle formed by at least a portion of said sidewall of said first chamber, said first baffle joined to at least a portion of said sidewall of said second chamber, said first baffle extending downward from said top walls of said first and second chambers and having a lower end positioned above said bottom wall, a second baffle formed in said second chamber which extends upward from said bottom wall and has an upper end positioned below said top wall of said second chamber, and said lower end of said first baffle is located closer to said bottom wall than is said upper end of said second baffle.

11. The baffle tank of claim 10 wherein each of said enlarged openings formed in said first and second chambers is covered by a removable piece of glass to slow down fluid evaporation.

12. The baffle tank of claim 10 wherein a structural member is present in at least one of said sidewalls to add rigidity.

13. The baffle tank of claim 10 further comprising a one piece molded member having a pair of spaced apart abutments molded into said bottom wall of said first chamber.

14. The baffle tank of claim 10 further comprising at least one pre-formed pilot dimple formed in said at least one sidewall or top wall for facilitating forming an opening.

15. The baffle tank of claim 10 wherein said first chamber is smaller than said second chamber, and said first chamber retains at least one basket containing a bacteria culture for biologically filtering said incoming fluid.

16. The baffle tank of claim 10 wherein said second chamber has at least two outlets formed therein, one of said outlet containing a grommet through which at least one electrical cord can pass.

17. The baffle tank of claim 10 wherein said enlarged opening in said first chamber is covered by a first piece of glass and a first finger depression is formed in said top wall of said first chamber, adjacent to said enlarged opening, to facilitate removal of said first piece of glass, and said enlarged opening in second chamber is covered by a second piece of glass and a second finger depression is formed in said top wall of said second chamber, adjacent to said enlarged opening, to facilitate removal of said second piece of glass.

18. A method of forming a baffle tank which can hold a volume of a fluid, said method comprising the steps of:
a) introducing solid plastic pellets into a mold;
b) heating said solid plastic pellets to form a molten substance;
c) forcing said molten substance to take the shape of said mold and form said baffle tank;
d) allowing said baffle tank to at least partially solidify; and
e) removing said baffle tank from said mold, said baffle tank having a bottom wall joined to at least one sidewall to form an enclosure having a first chamber in fluid communication with a second chamber, said first chamber having a top wall with an enlarged opening formed therein, said first chamber also having an inlet for receiving incoming fluid, said second chamber having a top wall with an enlarged opening formed therein, said second chamber also having an outlet through which fluid can be discharged, a first baffle formed by at least a portion of said sidewall of said first chamber, said first baffle joined to at least a portion of said sidewall of said second chamber, said first baffle extending downward from said top walls of said first and second chambers and having a lower end positioned above said bottom wall, a second baffle formed in said second chamber which extends upward from said bottom wall and has an upper end positioned below said top wall of said second chamber, and said lower end of said first baffle is located closer to said bottom wall than is said upper end of said second baffle.

19. The method of claim 18 wherein said mold is a rotational mold.

20. The method of claim 18 wherein said thermoplastic is one of the following: high density polyethylene, high density polypropylene, low density polyethylene or low density polypropylene.

* * * * *